METHOD AND APPARATUS FOR PRODUCING CHANNEL STEELS

Filed June 15, 1967 8 Sheets-Sheet 1

METHOD AND APPARATUS FOR PRODUCING CHANNEL STEELS

METHOD AND APPARATUS FOR PRODUCING CHANNEL STEELS

Nov. 10, 1970 IKUYA NODA ETAL 3,538,732

METHOD AND APPARATUS FOR PRODUCING CHANNEL STEELS

Filed June 15, 1967 8 Sheets--Sheet 7

United States Patent Office 3,538,732
Patented Nov. 10, 1970

3,538,732

METHOD AND APPARATUS FOR PRODUCING CHANNEL STEELS

Ikuya Noda, Iwate-ken, Akira Yamamoto, Hyogo-ken, Takashi Ueta, Tokyo, Hisao Minami and Ryo Hirano, Hyogo-ken, and Ken Ishiguro, Shinichiro Inoue, Fujio Someno, Sadao Hokari, and Goro Abe, Tokyo, Japan, assignors to Nippon Steel Corporation, Tokyo, Japan Filed June 15, 1967, Ser. No. 646,214
Claims priority, application Japan, June 21, 1966, 41/40,220
Int. Cl. B29b *1/08, 39/00*
U.S. Cl. 72—226 18 Claims

ABSTRACT OF THE DISCLOSURE

In a method of forming channel steels or sections, the channel steels or sections, as roughly shaped in a reversing blooming mill and a break down mill, are delivered to a universal rolling mill group including at least one universal rolling mill and an edging mill. The roughly shaped channel steel or sections are given a number of forward and backward passes through the universal rolling mill group and are then transferred to a finishing mill where they are again given a number of forward and backward passes. The universal rolling mill group may include two universal rolling mills with an edging mill positioned between the two universal rolling mills. In the universal rolling mill group, the workpieces are formed into roughly channel shapped steel or sections having the desired web thickness, flange thickness, flange width and contour. Special designs of rolls provide for substantial reduction or complete elimination of shoulders projecting at the junctures between the flanges and the webs of the channel steels or sections.

BACKGROUND OF THE INVENTION

The present invention relates to a method and apparatus for producing advantageously all types of channel steels including standard channel steels and channel steels of various special sizes and shapes by using a rough rolling mill group comprising one or two universal rolling mills and edging mill, and a finishing rolling mill group comprising a universal rolling mill or a structural rolling mill.

Conventionaly, a standard channel steel as shown in FIG. 1 has been produced by well known 2-high or 3-high structural rolling mills. However, the rolling is effected by upper and lower rolls having roll passes designed as shown in FIGS. 2(*a*) and (*b*) so that it is sometimes necessary to provide a taper 2 at the inside of the flanges 1, and the flange width 3 is limited due to the depth of passes grooved on the roll and the roll diameter. Further it requires many rolling stands having long roll body lengths to roll a channel steel having a large web width 5 because the material is subjected to many rolling steps, so that the size of finished products is limited.

For example, channel steels now ordinarily produced are of less than 500 mm. web width 5 and of less than 105 mm. flange width 3 and have a taper of about 5° to the perpendicular at the inside of the flange 1.

There are two principal rolling methods for producing a channel steel, as shown in FIG. 1, by a conventional 2-high or 3-high structural rolling mill.

The first method is known as "butterfly method" as shown in FIG. 2(*a*).

In this method, flat slab-like material may be used, and this method has the disadvantage that too much space for passes extending to the roll axis direction is required and it is not adaptable for producing large channel steels.

The other method is known as "beam roughing method" as shown in FIG. 2(*b*). In this method, a bloom or a roughly I-shape bloom as shown in FIG. 2(*c*) is used as starting material for production of large channel steels. In this method, which is also called the "counter flange method," the flanges are progressively reduced at one side or surface thereof. For the production of small channel steels, a billet is used, and this billet often has a height which is more than twice that of the flange width of the channel steels to be produced.

The beam roughing method as shown in FIG. 2(*b*) has a disadvantage that the roll groove must be deep in the roll body and, in addition, frictional action is large between the roll and the material.

Now, when the channel steels intended for production by the present invention, such as channel steels having parallel flanges as shown in FIGS. 3(*a*) and (*d*), channel steels having large flange width as shown in FIGS. 3(*a*) and (*b*) or channel steels having large web height as shown in FIG. 3(*c*), for example, are produced by any of the above conventional methods, it is required to provide additional rolling mill stands due to the requirement of space extending in the roll axis direction in the case of FIG. 3(*c*) when the butterfly method is applied, while in the beam roughing method, channel steels having parallel flanges as shown in FIGS. 3(*a*) and (*d*) are difficult to produce, and in the case of production of those having large flange widths as shown in FIGS. 3(*a*) and (*b*), it is required to increase the roll diameter because a deeper roll groove is needed, so that a large rolling mill is required. Further, for the production of channel steels having large web widths as shown in FIG. 3(*c*), a wide space is required in the roll axis direction so that the number of passes grooved on the roll is decreased and thus it is necessary to install additional rolling mill stands which is very uneconomical.

SUMMARY OF THIS INVENTION

One of the objects of the present invention is to provide a new and useful method for producing, efficiently and advantageously at a lower rolling cost with fewer rolling mill stands, conventional channel steels as shown in FIG. 1, as well as channel steels as shown in FIGS. 3(*a*)–3(*i*) which are almost impossible or very uneconomical to roll by the conventional methods for producing channel steels. The different channels steels produced by the present invention can be used in various applications such as mining beams, supporting frames, as well as columns, frames, beams and so on in combined form other than the conventional applications of channel steels. Further, a large angle steel having unequal leg length and thickness obtained by cutting along its web center, or cutting a W-type channel steel along its web center, as shown in FIG. 3(*h*) can be used as general structural material in shipbuilding, bridge and other constructions and civil engineering works etc. Further, channel steels having various types of projecting patterns 6 and 7 or grooves 8 on the outer surface of their flanges as shown in FIGS. 3(*e*), (*f*) and (*g*) are very useful as shield segments for underground workings, tunnel construction and the like.

Further, the present invention provides a new and useful method for advantageously producing channel steels of a wide range of shapes by using a finishing shape rolling mill or a finishing universal rolling mill with combination use of various roll designs.

For an understanding of the principles of the invention, reference is made to the following description of typical embodiments thereof as illustrated in the accompanying drawings.

BRIEF DESCRIPTION OF THE DRAWINGS

In the drawings:

FIGS. 3(*e*)–(*g*) are partial perspective views illustrating channel steels formed by the present invention;

FIG. 3(*h*) is a perspective view of a W-type channel steel produced in accordance with the invention;

FIG. 3(*i*) is a perspective view of a large angle steel, having unequal leg length and thickness, obtained by cutting along the center of the web of the channel steel shown in FIG. 3(*h*);

FIGS. 5(*a*) through 10(*d*) are partial elevation views illustrating various roll contours and shapes of materials, rolled at each rolling stand, in the method and apparatus of the invention;

DESCRIPTION OF THE PREFERRED EMBODIMENTS

Figure 1:
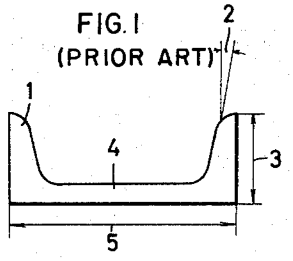
FIG. 1 (PRIOR ART)
FIG. 1 is an end elevation or cross sectional view of a standard channel steel.
Figure 2A:
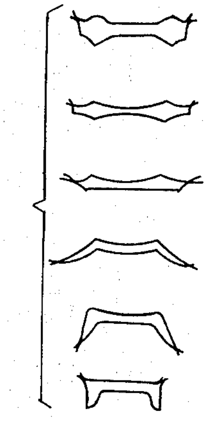
FIG. 2a (PRIOR ART)
FIGS. 2(*a*), (*b*) and (*c*) illustrate conventional methods of producing a channel steel.
Figure 2B:
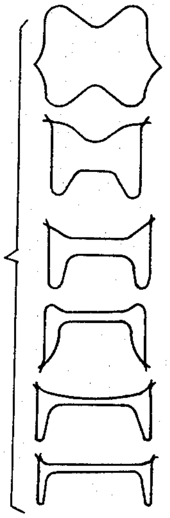
FIG. 2b (PRIOR ART)
Figure 2C:
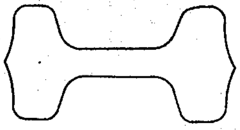
FIG. 2c (PRIOR ART)
Figure 3E:
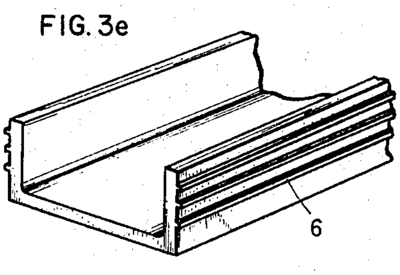
FIGS. 3(*a*)–(*d*) are end elevation or cross-sectional views of various channel steels produced in accordance with the invention.
Figure 3F:
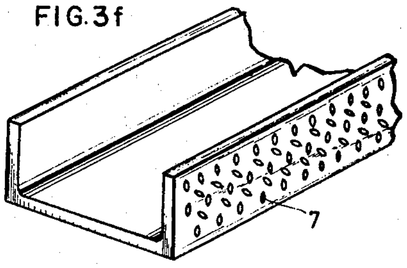
Figure 3A:
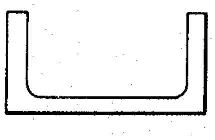
Figure 3D:
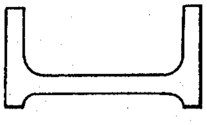
Figure 3G:
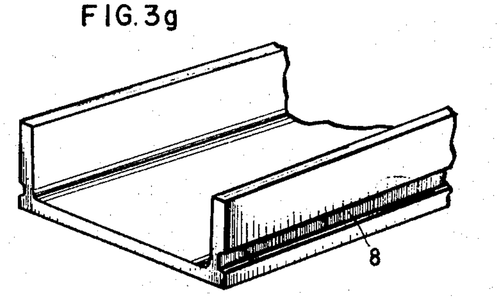
Figure 3B:
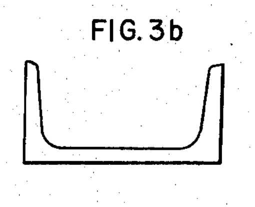
Figure 3C:
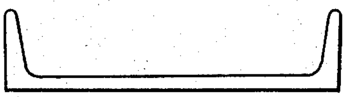
Figure 3H:
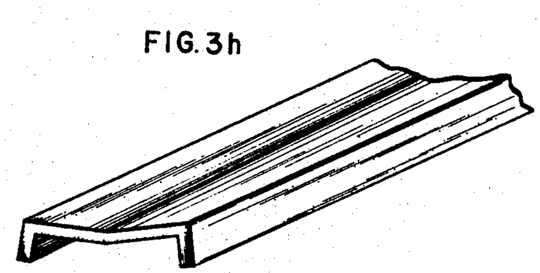
Figure 3I:
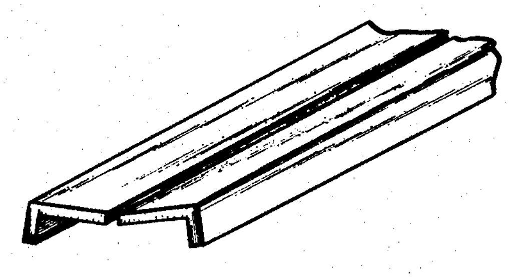
Figure 4A:
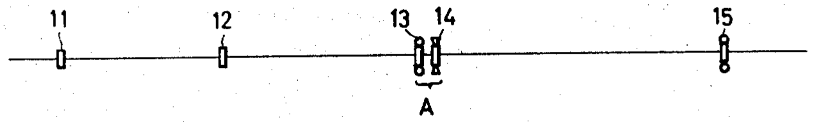
FIGS. 4(*a*)–(*d*) are schematic illustrations of trains of rolling mill stands in accordance with the present invention.
Figure 4B:
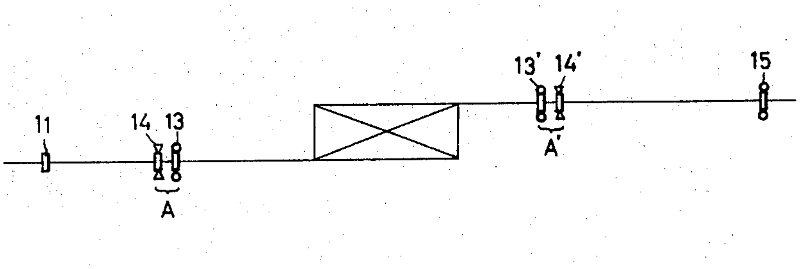
Figure 4C:
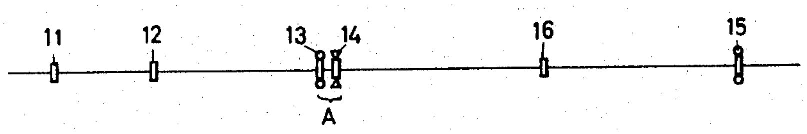
Figure 4D:
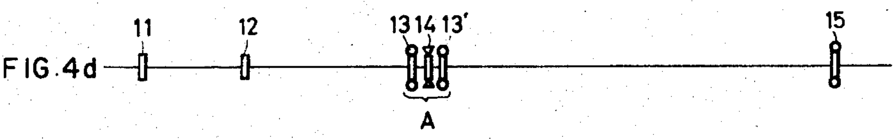

FIGS. 1 through 2(*c*) illustrate the prior art. The present invention will be described with particular reference to FIGS. 3(*a*) through 12.

The rolling operation will be described first refering to the rolling mill train as shown in FIG. 4(*a*). Ingots or like materials are rolled into blooms or shaped blooms in the reversing blooming mill 11 and delivered to a break down mill 12 where the materials are reduced into roughly shaped steels as shown by the cross hatched portion of FIG. 5(*b*). Then the rolling material 20 is delivered to the universal rolling mill group A comprising a universal rolling mill 13 and an edging mill 14, where the material is given a series of back and forth reducing passes and rolled into roughly channel shaped steel of the desired web thickness, flange thickness, flange width and contour.

Figure 6A:
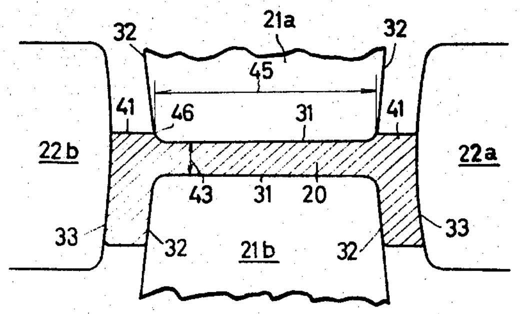
Figure 6B:
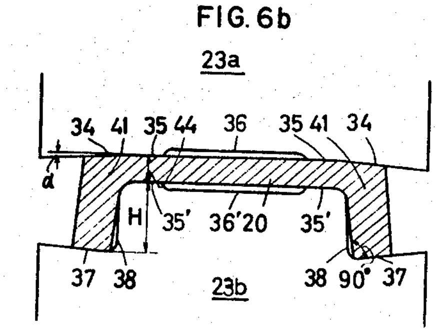
Figure 7A:
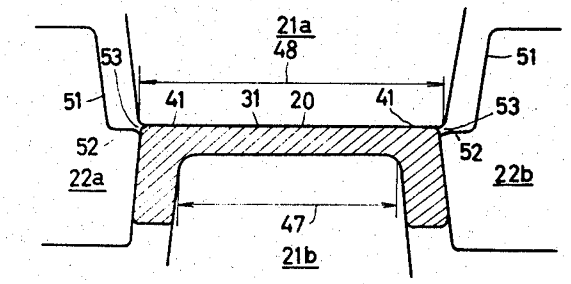
Figure 7B:
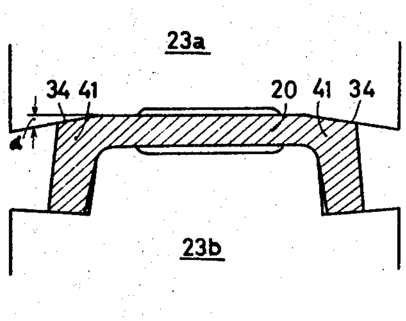
Figure 7C:
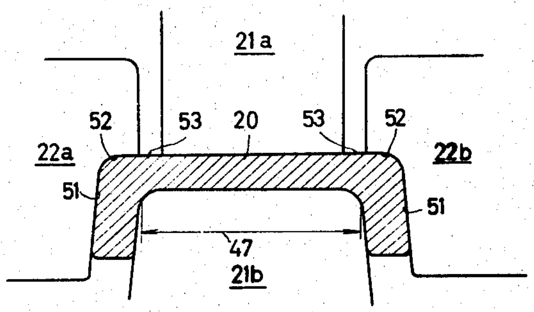
Figure 7D:
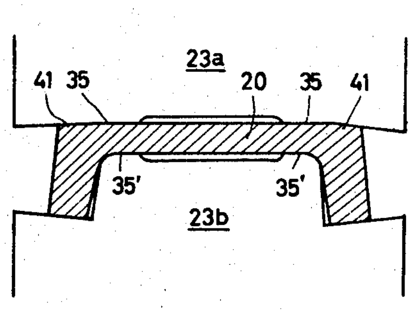
Figure 8A:
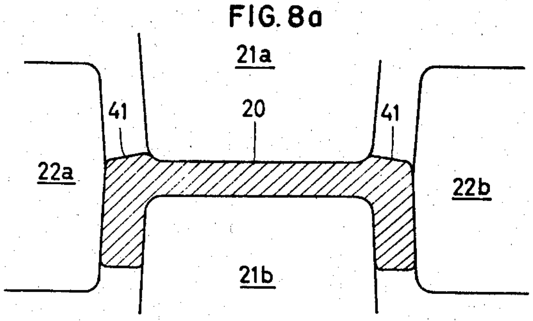
Figure 8B:
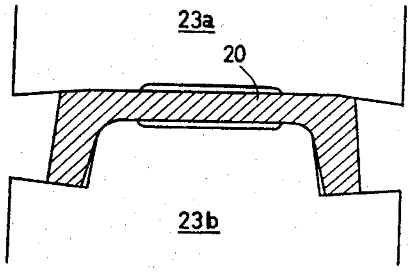
Figure 8C:
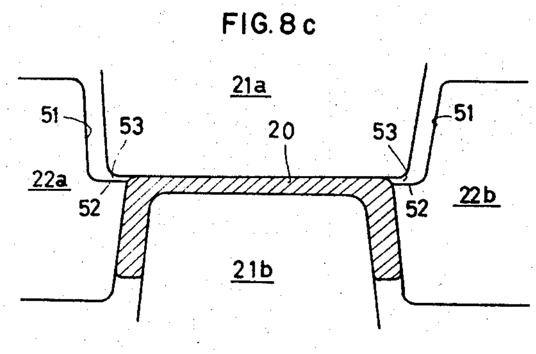
Figure 8D:
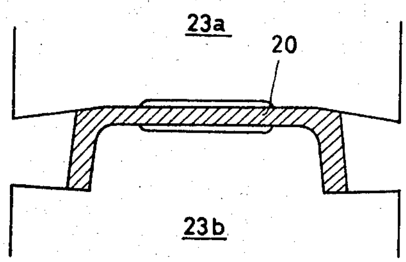
Figure 9A:
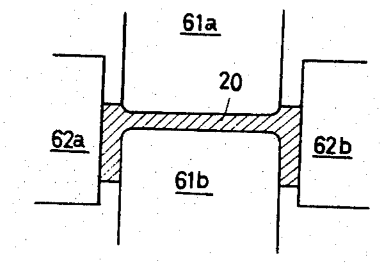
Figure 9B:
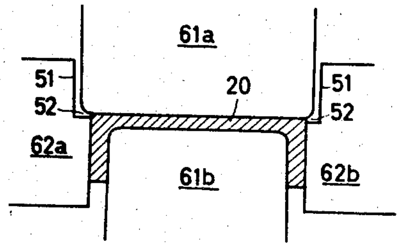
Figure 9C:
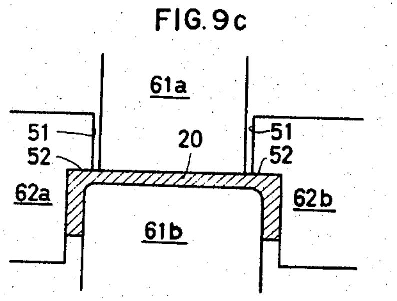
Figure 9D:
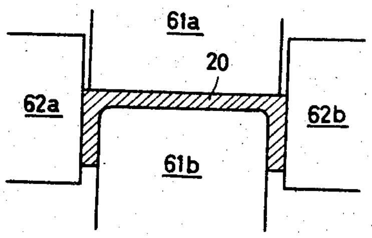

FIGS. 6(*a*) and (*b*) and FIGS. 7(*a*), (*b*), (*c*) and (*d*) show the designs of the rolls to be used in the reversing universal rolling mill group A for the production of channel steels, and the section of the rolling material 20 which is rolled in an up-down position. In the figures, 21*a*, 21*b* are upper and lower horizontal rolls and 22*a*, 22*b* are right and left vertical rolls. These four rolls are provided in the universal rolling mill shown at 13 in FIG. 4. The upper and lower horizontal rolls 21*a*, 21*b* are driven by a motor, while the right and left vertical rolls 22*a*, 22*b* are driven by frictional contact with the material 20 rolled on the mill. FIG. 6(*b*) and FIGS. 7(*b*) and (*d*) show the edging mill 14, and 23*a*, 23*b* are upper and lower horizontal rolls. The edging mill 14 is equipped with these upper and lower horizontal rolls 23*a*, 23*b*, which are driven by a motor.

In this way, in the present invention, the web portions of the rolling material are gradually reduced through each passage between the upper and lower horizontal rolls 21*a* 21*b* of the universal rolling mill 13 and the flange portions of the material are similarly reduced between the side walls of the lower horizontal roll 21*b* and the right and the left vertical rolls 22*a*, 22*b*. The horizontal rolls

23*a*, 23*b* of the edging mill 14 roll the shoulder portions 41 at the joints of the flanges, and roll the web and the flange edges. Except for the channel steel having the shoulder portions at the joints of the flanges and the web as shown in FIG. 3(*d*), all the channel steels in FIGS. 3(*a*)–3(*i*) are rolled in the universal rolling mill group A in such a manner as to reduce the shoulder portions as much as possible, or to eliminate the shoulder portions.

For this purpose, considerations are given to the roll designs, and to adjustment of the reduction rate in each pass in the universal rolling mill group A, and further considerations are given to the shape of beam blanks during the rolling operation by the break down mill or the blooming mill.

The roll designs of the universal rolling mill group used in accordance with the present invention to produce the channel steels shown in FIGS. 3(*a*)–3(*i*) will now be explained with reference to FIGS. 6(*a*)–7(*d*).

The roll design for the universal rolling mill in FIG. 6(*a*) is similar to that used in ordinary H-section rolling and the rolls of the edging mill of FIG. 6(*b*) are designed in such manner that the rolling of the shoulder portions 41 at the joints of the web and the flanges, the rolling of the flange edge portion and the flange width are regulated. Namely, the upper and lower horizontal rolls 21*a*, 21*b* have web-rolling surfaces 31 and flange-rolling surfaces 32, while the right and left vertical rolls 22*a*, 22*b* have flange-outerside-rolling surfaces 33. In the rolls of the edging mill, the upper roll 23*a* comprises shoulder-portion-rolling surfaces 34, web-contacting surfaces 35, and a recessed center surface 36, and the lower roll 23*b* comprises flange-edge-rolling surfaces 37, flange-inside rolling surfaces 38, web-contacting surfaces 35' and a recessed center surface 36'.

Further, in the universal rolling mill group the rolls are designed in such manner so that the flanges of the material may be rolled inclining outwardly at 4 to 10 degrees to the perpendicular so as to enable redressing of the rolls and to prevent the wear of the rolls and the sticking of the material onto the rolls.

In this rolls design for the edging mill, the shoulder-portion-rolling surface 34 is horizontal or slightly sloped at a small angle $\alpha$ as shown in FIG. 6(*b*). Thus in the case of rolling the web and flanges of the material 20 by the rolling surfaces 31, 32 and 33 in the ordinary universal rolling rolls as shown in FIG. 6(*a*), the projection of the shoulder portion is maintained to be not excessively large so as to prevent overfills during the subsequent finishing rolling with light reduction in the finishing universal rolling mill.

In this case however, if the angle $\alpha$ is too large, an insufficiently rounded shoulder will result.

In the lower roll 23*b*, a distance H from the web-contacting surface 35' to the flange-edge rolling surface 37 is nearly equal to the difference between the flange width and the web thickness of the final product, and the angle between the flange inside surface 38 and the flange-edge rolling surface 37 is nearly 90°. The roll surfaces 35, 36 and 35', 36' opposing the web surfaces of the material 20 do not effect positive rolling action on the material 20, and the rolls are positioned so that the web thickness 43 of the material 20 becomes nearly equal to the clearance 44 between the upper and lower rolls at the points 35 and 35'. As regards the recessed center surfaces 36, 36' and the flange-inside surface 38, a small clearance is maintained between the roll and the material so that the material will not contact these portions and the power of the edging mill motor is not wasted.

The roll shape in the above universal rolling mill (FIG. 6(*a*)) is almost the same as used in the case of rolling a standard H-section steel, although if the width 45 of the upper horizontal roll 21*a* is somewhat larger than that of the lower rolls 21*b*, or if the radius connecting the web-rolling surface 31 and the flange-roling surfaces 32 of the upper horizontal roll 21*a* is larger that of the lower roll, remarkable effectiveness is obtained for both restricting the excessive projection of the shoulder portions 41 of the material and preventing seamlike defects such as hollows, which often occur at the joint portions between the shoulder portions 41 and the web portions during rolling of the shoulder portions by the edging mill.

Next, according to the present invention, the flanges, web and shoulder portions 41 of the material may be simultaneously rolled by using rolls of special shape, as shown in FIG. 7, in the universal rolling mill. Further explanation will be made on this point.

The width 47 of the lower horizontal roll in the universal rolling mill as shown in FIG. 7(*a*) may be determined according to desired sizes of products, while the width 48 of the upper horizontal rolls is maintained to be nearly equal to the width (49 in FIG. 5) of beam blanks supplied from a blooming mill or a break down mill and the right and left vertical rolls are provided with a step 52 and a wall 51 according to the width of the upper and lower horizontal rolls. When the material 20 is rolled by a universal rolling mill having rolls of such shapes as above, the shoulder portions 41 of the material will not project in the vertical direction but the material tends to project in the horizontal direction between the rolling surface 31 and the step 52 of the right and left vertical rolls 22*a*, 22*b*. For this reason, edging mill rolls as shown in FIG. 7(*b*) are used, where the angle $\alpha$ of the shoulder portion rolling surface 34 is enlarged.

Now referring to the universal rolling mill rolls shown in FIG. 7(*c*), the roll width 47 of the lower horizontal roll may be decided by the size of the product. However, the upper horizontal roll 21*d* has a smaller width than the lower horizontal roll, and the right and left vertical rolls are provided with a step 52 and a wall 51.

When the material 20 is rolled by an universal rolling mill having rolls of the above-mentioned shape, projections occurs on the web portion at the points 53 between the side wall of the upper horizontal roll and the right and left vertical rolls 22*a*, 22*b*, while no projections will occur at the shoulder portions of the material 20. For this reason, edging mill rolls as shown in FIG. 7(*d*) are used, and the projection of the web portion at the point 53 in FIG. 7(*c*) can be positively rolled by the web-contacting surfaces 35, 35′.

The right and left vertical rolls 22*a*, 22*b* of the universal rolling mill of FIG. 7(*c*) are heavily loaded in the vertical direction in addition to horizontal loading, and thus it is necessary to strengthen the supports therefor against this vertical loading. As to the horizontal rolls 21*b*, the upper horizontal roll 21*a* is fixed and only the lower horizontal roll 21*b* is movable vertically so as to position the web portion, both in the case of FIG. 7(*a*) and that of FIG. 7(*c*).

The use of such special roll shapes for the universal rolling mill roll causes the metal projections as mentioned above, and the use of beam blanks having large cross sections is disadvantageous as it is necessary to enlarge the step 52 and the wall 51 of the vertical rolls 22*a*, 22*b* and is undesirable from the fact that the projections become larger. Therefore, the beam blank used in this case should be one having a small cross section close to the product size, and use of such special roll shape is desirable in the train of rolling mill stands as described hereinafter.

Figures 5A, 5B:
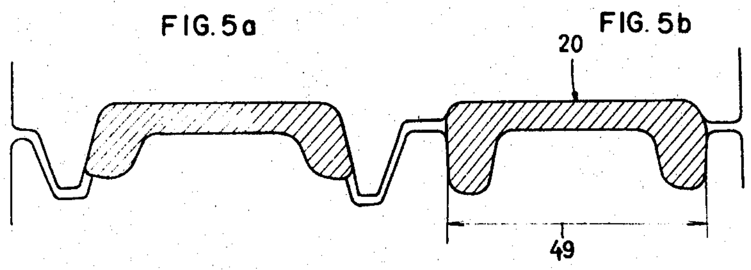
FIGS. 5(*a*) and (*b*) are sectional views of roll stands producing the rough shapes for rolling into channel steels.

The train of rolling mill stands as shown in FIG. 4(*b*) comprises a blooming mill stand 11, a roughing universal rolling mill group A, an intermediate universal rolling mill group A′, and a finishing universal rolling mill 15. Each of the roughing and intermediate universal rolling mill groups A and A′ comprises the universal rolling mills 13 and 13′ and the edging mill 14 and 14′ in combination. In the above rolling mill train, the material is rolled into a beam blank as shown in FIG. 5(*b*) by the blooming mill 11, and then rolled by several back and forth passes through the roughing universal rolling mill group A and delivered to the intermediate universal rolling mill group A′ where the material is rolled, by fewer back and forth passes than in the roughing universal rolling mill group A, into desired web thickness, flange thickness, flange width, and contour, and finally the material is finished into a final product, usually by one pass through the finishing universal mill 15.

With reference to FIGS. 8(*a*) through (*d*), one example of roll shape, according to the present invention, as used in each mill of the roughing and intermediate universal rolling mill groups A and A′, in the above rolling mill train, will now be explained.

FIG. 8(*a*) shows the universal rolling mill roll, and FIG. 8(*b*) is the edging mill roll. The shape and rolling action of these rolls are the same as in the case of FIGS. 6(*a*) and (*b*). Each of the rolls of FIGS. 8(*c*) and (*d*) is shown to have a shape suitable for use in the intermediate rolling mill group A′, and the shape and rolling action of these rolls are the same as in the case of FIGS. 7(*a*) and (*b*).

Instead of the rolls of FIGS. 8(*c*) and (*d*), roll shapes as shown in FIGS. 7(*c*) and (*d*) may be used and their rolling action is the same as in the case of FIGS. 7(*c*) and (*d*).

So far, the shape of the rolls as well as their rolling action have been described according to the groups of universal rolling mills equipped with rolls of various shapes. In these cases, it is desirable that the rolling reduction at the web and the flanges is not so large at each rolling pass in the universal rolling mills. In case a large reduction, especially on the flange, is taken at one time in reversing passes in the universal rolling mills having rolls as shown in FIG. 6(*a*) or in FIG. 8(*a*), the projections at the shoulder portions 41 of the material 20 become so large that the rolling of the shoulder portions 41 in the edging mill is difficult, and a seam-like defect or hollow is apt to occur. Further in case a large reduction is taken in the universal rolling mill as shown in FIGS. 7(*a*) and (*c*) and FIG. 8(*c*), projections are apt to be formed between the upper horizontal roll and the steps 52 of the right and the left vertical rolls. Although the reduction rate on the web and the flanges in the universal rolling mill depends upon the dimensions of the products and the rolling conditions, etc., it is desirable that the reduction on both portions is taken to be nearly equal, or the reduction on the flanges may be a little larger.

The shape of the beam blank in the blooming mill or in the break down mill are to be decided according to the number of passes, the reduction of the web and the reduction of the flanges. Nevertheless a sufficient consideration must be given to deciding the shape of the portions corresponding to the above mentioned shoulders 41, as well as the width of the flange.

According to the present invention, the material is rolled into the beam blank, which is given back and forth passes in the universal rolling mills into the roughly shaped channel steel having the desired web thickness, flange thickness, flange width, and contour. The material obtained is finally shaped and sized into the product through one pass or, if necessary, a few passes, in the finishing universal rolling mills as shown in FIGS. 9(*a*), (*b*), (*c*) and (*d*). This finishing universal rolling mill comprises the upper and the lower horizontal rolls 61*a*, 61*b* driven by a motor and the right and the left vertical rolls 62*a*, 62*b* driven by frictional contact with the material 20. The rolls shown in FIG. 9(*a*) are the same as the rolls used in the production of a standard H-steel section, and are mainly applied for the production of channel steel sections having shoulders shown in FIG. 3(*b*), while it is desirable that standard channel steel sections with a flat web outer surface are finished with rolls having special shapes as shown in FIGS. 9(*b*), (*c*) and (*d*).

The shapes of the rolls for the above-mentioned universal rolling mills and their rolling action are explained below.

The rolls shown in FIGS. 9(*b*) and (*c*) are based upon the same idea as the rolls shown in FIGS. 7(*a*) and (*c*), and have nearly the same rolling action upon the material 20, whereby the shoulders as well as the web and the flanges of the material 20 can be finished simultaneously. Especially, the reduction of the web, using the rolls as shown in FIG. 9(*b*), and the reduction of the flanges, using the rolls as shown in FIG. 9(*c*) must be sufficiently small that fins or projections do not occur on the product.

Further in the case of this finishing universal rolling mill, the rolling surfaces of the lower horizontal rolls 61*b* for the inside of the flanges and those of the vertical rolls 62*a*, 62*b* for the outside of the flanges are almost perpendicular to each other.

In the case of FIG. 9(*d*), the lower horizontal roll 61*b* and the right and the left vertical rolls 62*a*, 62*b* used for the production of H-steel sections, and the upper horizontal roll 61*a* which has almost the same width as the width of the web of the products, are used, whereby the shoulders 41 of the material 20 are reduced with the roll 61*a*. With the finishing universal rolling mills equipped with the above-mentioned rolls, the material 20 is finished into a product with the desired shape and size, with very light reduction on the web and the flanges. If the reduction is unreasonably too large, or if the material delivered from the group of the roughing universal rolling mills has a small shoulder, small fins or projections are apt to occur at the clearance between the upper horizontal roll 61*a* and the right and the left vertical rolls 62*a*, 62*b*. These fins or projections can, however, be easily removed by flame cutting, grinding, or other procedures after cooling and without any adverse influence upon the product.

According to the present invention, when the universal rolling mill is used for the finishing of channel steel sections, it is possible to produce channel steel sections having high projections of good shape, or deep grooves of good shape, on the outer surface of the flanges as shown in FIGS. 3(*e*), (*f*) and (*g*).

A low projection or a shallow groove can be formed on the outer surfaces of channel steel sections even according to the conventional method where guide-rolls having a groove or a projection are mounted at the exit of the rolling mills. The height of the projection or the depth of the groove and their contours formed according to the present invention are by far superior to those obtained with the conventional method. The projections or the grooves can be formed either on one side or on both sides of the flanges.

The method of forming the grooves on both outer surfaces of the channel steel sections is explained below referring to FIG. 11.

Figure 11:
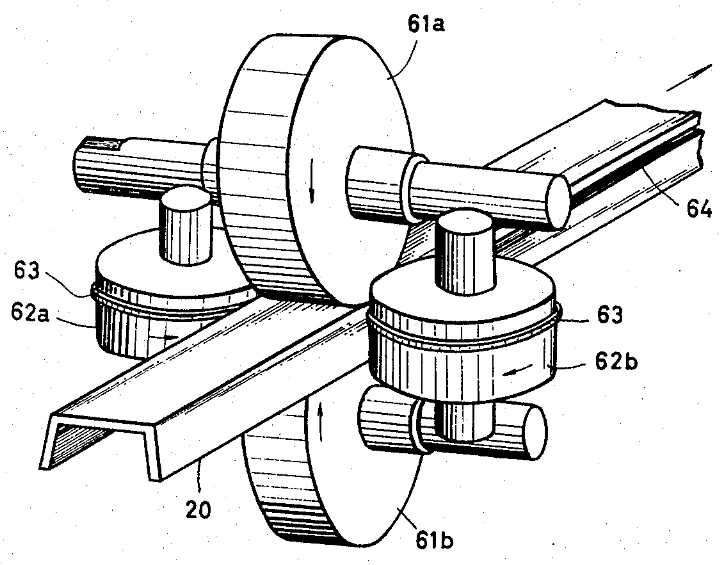
FIG. 11 is a partial perspective view illustrating the production of channel steels having projections or grooves on the outer surfaces of their flanges.

In FIG. 11, 61*a* is the upper horizontal roll, 61*b* the lower horizontal roll, and 62*a*, 62*b* the left and the right vertical rolls. 63 is the projection formed around the circumference of the rolling surface of the vertical rolls 62*a*, 62*b*, with which projections 63 the grooves 64 on both outer surfaces of the flanges of the material 20 are formed, whereby the channel steel section shown in FIG. 3(*g*) is obtained. For the rolls of the finishing universal rolling mills shown in FIG. 11, the rolls shown in FIGS. 9(*a*), (*b*), (*c*) and (*d*) can be used, whereby the projections or the grooves are formed on the outer surfaces of the flanges of the channel steel sections.

Further as shown in (*c*) of FIG. 4, it is possible to produce channel steel sections by using two-high or three-high rolls in the finishing mill. The explanation therefor follows.

Figure 10A:
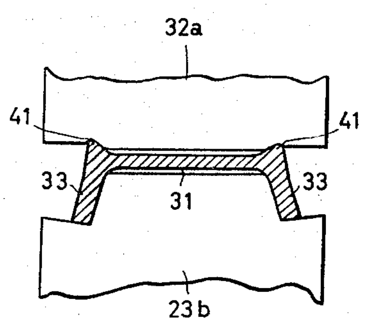
Figure 10B:
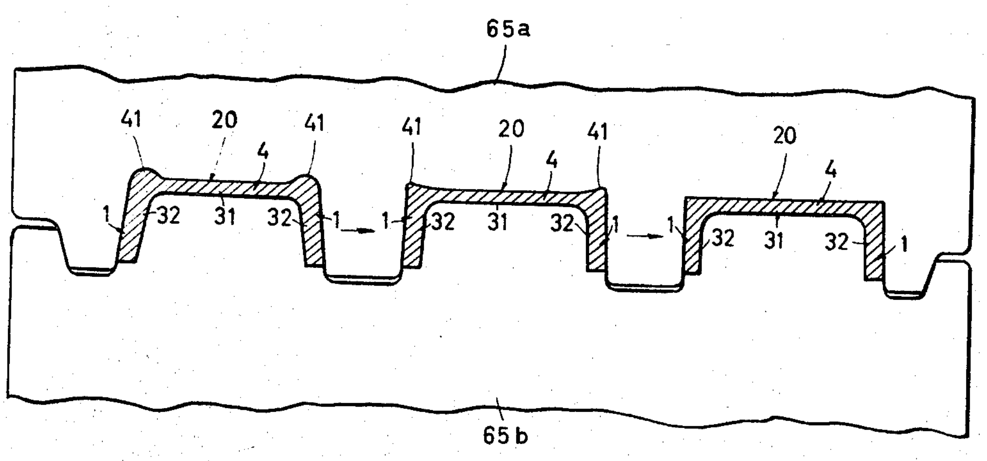

Similarly to the case of using the finishing universal mill, the maerial which is reduced in the group A, of the desired web and flange thickness, flange width and contour, is delivered, for example, to the finishing structural mill equipped with the rolls as shown in FIG. 10(*b*), whereby the material is rolled into a final product with the horizontal rolls 65*a*, 65*b* having one or several grooves. Because the major rolling reduction, as to the thickness of the web 4 and the thickness and the width of the flanges 1, has already been carried out by the group A of the universal rolling mills, the material is formed into a final shape by taking light reduction on the web 4 and the flanges 1, while outwardly inclined flange portions are straightened and the shoulder portions 41 are eliminated. In the case of the ordinary steel section or the special steel sections shown in FIGS. 3(*a*), (*b*) and (*c*), these corners 41 are rolled during the finishing process into a part of the web 4 or of the flanges 1, while the products having the shoulders 41 can also be obtained as shown in FIG. 3(*d*) as one modification of the special channel steel sections. For such modification the finishing rolling is done mainly to straighten the flanges 1.

Meanwhile it is possible to obtain a properly shaped channel steel section or special channel steel section, without difficulty, by reducing the shoulders 41 to some extent during the universal rolling process. In other words, the shoulders 41 with a proper shape and size play an important role in preventing underfill at the corner parts of the joints of the web 4 and the flanges 1 of the products during the finishing forming process. Nevertheless, when the thickness or shape of the shoulders 41 is too large, a substantial part of the finishing rolling has to be spent in reducing the shoulders, so that the desired finish forming becomes difficult. On the other hand when these are too small, underfill is apt to occur at the shoulder 41. Under such circumstances, sufficient consideration should be given to the proper shapes of the horizontal and vertical rolls of the universal rolling mills or of the rolls of the edging mills, and to the shapes and dimensions of the shoulders 41 in each rolling process, as to well as the shapes of the beam blanks for the channel steel sections produced with the blooming mill or the break down mill.

In order to attain shapes and the proper sizes of the shoulders 41, the materials should be rolled under light reduction, so that shoulders 41 may be left, using rolls with such shapes as shown in FIG. 6(*a*) or FIG. 8(*a*) in the universal rolling mills 13 of the group A of the universal rolling mills and using rolls with such shapes as shown in FIG. 10(*a*) in the edging mill 14.

Figure 12:
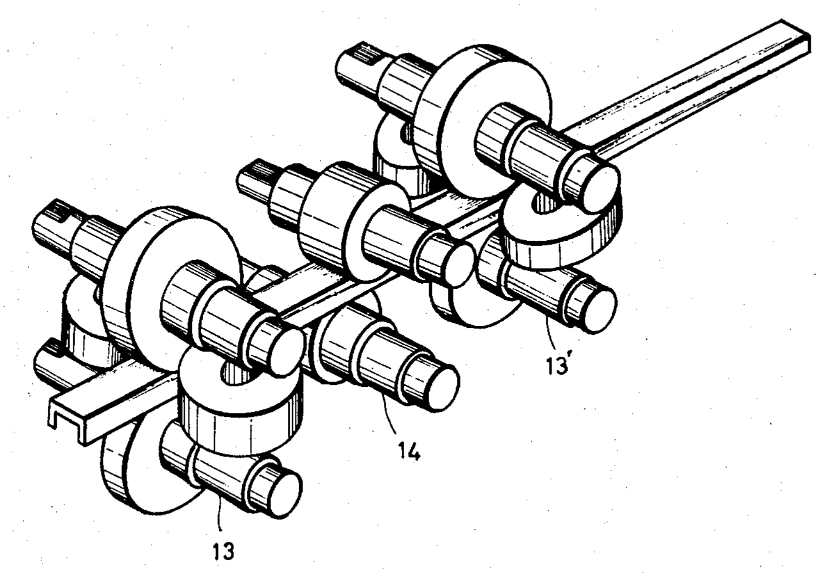
FIG. 12 is a partial perspective view illustrating the rolling operation performed by a roughing rolling mill group comprising two roughing universal rolling mills and one edging mill therebetween.

The method for producing the channel steel according to the present invention now will be described in detail referring to FIG. 4(*d*), which shows a group of the roughing mills, as shown in FIG. 12, comprising 2 sets of universal roughing mills 13, 13′ and edging mill 14 positioned between the universal roughing mills, and the finishing rolling mill stand consisting either of the universal rolling mill 15 or of a structural rolling mill (not shown in the figure).

At first, the beam blank is produced with the blooming mill or the break down mill, and then the thickness of the web is reduced with the upper and lower horizontal rolls of the universal rolling mill while the thickness of the flanges is reduced with the vertical rolls and horizontal rolls. Then the flange edges are rolled with the edging mill 14, while the thickness of the web and the flanges is further reduced with the universal rolling mill 13′ which is spaced positioned closely adjacent the edging mill. Thus, one rolling pass is completed.

The material which has thus completed the rolling pass through mills 13, 14 and 13′ is then rolled back through mills 13′, 14 and 13. The material, thus reduced into the desired thickness of the web and of the flanges and into the desired width of the flanges after several to ten times repeated back and forth passes, is delivered to the finishing rolling mill where the material is given one or several rolling passes.

The rolls used in this mill group may be the same as the ones used in the before mentioned mill group comprising one universal rolling mill and one edging mill. Namely, in the first and second universal rolling mills, the rolls as shown in FIGS. 6(*a*), 7(*a*), (*c*) can be used and, in the edging mill, the rolls as shown in FIGS. 6(*b*), 7(*b*), (*d*) and 10(*a*) can be used, in accordance with the rolls used in the universal rolling mills.

Meanwhile, in the finishing step, the rolls as shown in FIGS. 9(*a*), (*b*), (*c*), (*d*) are used in the universal rolling mill and the rolls as shown in FIG. 10(*b*) are used in the structural rolling mill.

According to the present method, the distance between the first roughing universal rolling mill 13 and the second roughing universal rolling mill 13′ is less than the length of the material so that the material may be rolled simultaneously through two universal roughing mills and an intermediate edging mill.

The mills form a reversible roughing mill group with three rolling mills, so that one rolling pass may give an effective reduction to the material, which reduction is comparable to those obtained by a plurality of rolling passes in a conventional roughing mill group; moreover, the time loss during the conveying of the material is small, so that the required reductions in the roughing mill group may be obtained in a considerably shorter time than hitherto. It is, therefore, possible to obtain a very high rolling efficiency.

Furthermore, the hot rolling resistance of the material increases as its temperature drops, and the temperature drop of course increases with increase in rolling time and decrease in the thickness of the material.

With the apparatus used in the invention method, channel sections having an unusually thin cross section on each portion, or channel sections made of materials having such high rolling resistance as to make it impossible for them to be worked by conventional apparatus, may be easily manufactured.

Moreover, while in known processes for rolling steel material the quality and shape of the product may be improved by applying adequate tension to the material to be rolled, in the apparatus of the present invention, according to the degree of pressure applied to the material, an adequate tension from zero to a required value may easily be applied to the material to be rolled between two sets of universal roughing mills, whereby both the quality of the product and the productivity are improved.

When comparing the manufacturing method according to the present invention with the conventional "beam roughing method" adapted for the production of a large channel steel section, it is sufficient, according to the invention, that the width of the flanges of the beam blanks produced with the blooming mills or the break down mill is almost equal to that of the flanges of the product or is a little greater, while a width more than twice as large is usually needed for the conventional "beam roughing method," so that the frictional action on the side walls of the materials is by far smaller in case of the manufacturing method according to the present invention, and therefore the roll wear in the present invention is very small.

Further, the inclination of the outer sides of the passes of the rolls according to the "beam roughing method" is usually 30′ to 2° while that of the rolls according to the present invention is as large as 4° to 10°, so that, for the same amount of wear on the side walls of the rolls, a lesser amount of dressing is required according to the present invention. The group of the universal rolling mills carrying out a larger part of the rolling work in the invention is very useful in shortening the rolling time and in keeping the temperature decrease small, because it is capable of repeating back and forth passes through a reversible system. In view of the fact that the rolls for the universal rolling mills are also utilized for rough rolling, all rolls of the universal mill can be used for rolling all channel steel sections of similar sizes when the following two quantities of the steel sections are almost of equal amount:

(Height of web) − (2× width of flange);
(Width of flange) − (thickness of web).

Further, to say nothing of such ordinary channel steel sections as shown in FIG. 1, it is possible to produce profitably large channel steel sections such as ones having parallel flanges (*a*), large flange widths (*b*), or large web width (*c*), etc., as well as channel steel section as shown in FIG. 3(*d*) having shoulders at the joints of the web and the flanges and combinations of the above, and even channel steel sections with such well shaped projections 6, 7 or grooves 8 of various kinds on the outer surfaces of the flanges, as shown in FIGS. 3(*e*), (*f*), (*g*). With the manufacturing method according to the present invention, it is possible to produce such large steel sections as those having web widths of about 1000 mm. and flange widths of 250 mm., so that such large channel steel sections, which could hitherto be obtained only by welding, have become easily obtainable according to the present invention, at low cost and with sufficient strength as well as good contour, while the application field for those channel steel sections is wide open, as previously mentioned.

Although in the explanation of the invention only the method and the device by which the materials are rolled, in an up down state, the present invention is not limited thereto, and it is also possible to roll the material in an upward position.

What is claimed is:

1. A method of rolling a channel steel section, having web and flange portions, utilizing a reversible roughing mill group including a universal rolling mill and an edging mill positioned closely adjacent each other, said method comprising the steps of passing the roughed blank through the roughing mill group in one direction with both mills rolling the blank simultaneously, and with the universal mill reducing simultaneously the web and flange portions of the blank and the edging mill rolling the flange edges; then passing the roughly rolled blank through the roughing mill group in the opposite direction; and repeating such back and forth passes through the roughing mill group while utilizing the edging mill to reduce the projecting shoulders at the junctions of the flange and web portions formed during rolling of the blank through the universal mill, to obtain a rough channel steel section.

2. A method of rolling a channel steel section, as claimed in claim 1, including the further step of passing the rough channel steel section through a finishing universal rolling mill for at least one pass.

3. A method of rolling channel steel section, having web and flange portions, utilizing a reversible roughing mill group including a universal rolling mill and an edging mill positioned closely adjacent each other, said method comprising the steps of passing the roughed blank through the roughing mill group in one direction with both mills rolling the blank simultaneously, and with the universal mill reducing simultaneously the web and flange portions of the blank and the edging mill rolling the flange edges; then passing the roughly rolled blank through the roughing mill group in the opposite direction; and repeating such back and forth passes through the roughing mill group while rolling the outer surface of the web with the upper horizontal roll of the universal rolling mill, to provide a substantially flat outer surface of the web free of any projecting shoulders at the joints of the web and flange portions, and utilizing the upper roll of the edging mill to reduce the outside corners at the joints of the flange and web portions, to obtain a rough channel steel section.

4. A method of rolling a channel steel section, as claimed in claim 3, including the further step of passing the rough channel steel section through a finishing universal rolling mill for at least one pass.

5. A method of rolling channel steel section, having web and flange portions, utilizing a reversible roughing mill group including a universal rolling mill and an edging mill positioned closely adjacent each other, said method comprising the steps of passing the roughed blank through the roughing mill group in one direction with both mills rolling the blank simultaneously, and with the universal mill reducing simultaneously the web and flange portions of the blank and the edging mill rolling the flange edges; then passing the roughly rolled blank through the roughing mill group in the opposite direction; and repeating such back and forth passes through the roughing mill group while rolling the outer corners of the web with the vertical rolls of the universal rolling mill, rolling the outer central portion of the web with the upper horizontal roll of the universal rolling mill, and utilizing the upper roll of the edging mill to reduce the web projections between the corners and the center portions of the outer surface of the web, formed during rolling of the blank through the universal mill, to obtain a rough channel steel section.

6. A method of rolling a channel steel section, as claimed in claim 5, including the further step of passing the rough channel steel section through a finishing universal mill for at least one pass.

7. A method of rolling a channel steel section, having web and flange portions, utilizing a reversible roughing mill group including first and second universal rolling mills and an edging mill intermediate the universal rolling mills, the three mills being spaced from each other a distance less than the length of the material to be rolled, said method comprising the steps of passing the roughed blank through the first universal mill, the edging mill and the second universal mill in succession in one direction with the three rolling mills rolling the blank simultaneously during at least a part of the pass, and with the universal mills reducing simultaneously the web and flange portions of the blank and the edging mill rolling the flange edges; then passing the roughly rolled blank through the roughing mill group in the opposite direction; and repeating such back and forth passes through the roughing mill group while utilizing the edging mill to reduce the projecting shoulders at the junctions of the flange and web portions, formed during rolling of the blank through the universal mills, to obtain a rough channel steel section.

8. A method of rolling a channel steel section, as claimed in claim 7, including the further step of passing the rough channel steel section through a finishing universal rolling mill for at least one pass.

9. A method of rolling a channel steel section, having web and flange portions, utilizing a reversible roughing mill group including first and second universal rolling mills and an edging mill intermediate the universal rolling mills, the three mills being spaced from each other a distance less than the length of the material to be rolled, said method comprising the steps of passing the roughed blank through the first universal mill, the edging mill and the second universal mill in succession in one direction with the three rolling mills rolling the blank simultaneously during at least a part of the pass, and with the universal mills reducing simultaneously the web and flange portions of the blank and the edging mill rolling the flange edges; then passing the roughly rolled blank through the roughing mill group in the opposite direction; and repeating such back and forth passes through the roughing mill group while rolling the outer surface of the web with the upper horizontal roll of the universal rolling mill to form a substantially flat outer web surface free of projections at the joints of the web and flange portions and utilizing the upper roll of the edging mill to reduce the corners at the joints of the flange and web portions, to obtain a rough channel steel section.

10. A method of rolling a channel steel section, as claimed in claim 9, including the further step of passing the rough channel steel section through a finishing universal rolling mill for at least one pass.

11. A method of rolling a channel steel section, having web and flange portions, utilizing a reversible roughing mill group including first and second universal rolling mills and an edging mill intermediate the universal rolling mills, the three mills being spaced from each other a distance less than the length of the material to be rolled, said method comprising the steps of passing the roughed blank through the first universal mill, the edging mill and the second universal mill in succession in one direction with the three rolling mills rolling the blank simultaneously during at least a part of the pass, and with the universal mills reducing simultaneously the web and flange portions of the blank and the edging mill rolling the flange edges; then passing the roughly rolled blank through the roughing mill group in the opposite direction, and repeating such back and forth passes through the roughing mill group, while rolling the outer corners of the web with the vertical rolls of the universal rolling mill, rolling the outer center portions of the web with the upper horizontal roll of the universal rolling mill, and utilizing the upper roll of the edging mill to reduce the web projections formed between the corner and center portions, to obtain a rough channel steel section.

12. A method of rolling a channel steel section, as claimed in claim 11, including the further step of passing the rough channel steel section through a finishing universal rolling mill for at least one pass.

13. A method of rolling a channel steel section having web and flange portions, utilizing a reversible roughing mill group including a universal rolling mill and an edging mill positioned closely adjacent each other, said method comprising the steps of passing the roughed blank through the roughing mill group in one direction with both mills rolling the blank simultaneously, and with the universal mill reducing simultaneously the web and flange portions of the blank and the edging mill rolling the flange edges; then passing the roughly rolled blank through the roughing mill group in the opposite direction; repeating such back and forth passes through the roughing mill group while utilizing the edging mill to reduce the projecting shoulders at the junctions of the flange and web portions, formed during rolling of the blank through the universal mill, to obtain a predetermined shoulder shape on a rough channel steel section; and then passing the rough channel steel section through a finishing structural mill, having horizontal rolls formed with at least one peripheral groove, to further reduce the shoulders.

14. A method of rolling a channel steel section, having web and flange portions, utilizing a reversible roughing mill group including first and second universal rolling mills and an edging mill intermediate the universal rolling mills, the three mills being spaced from each other a distance less than the length of the material to be rolled, said method comprising the steps of passing the roughed blank through the first universal mill, the edging mill and the second universal mill in succession in one direction with the three rolling mills rolling the blank simultaneously during at least a part of the pass, and with the universal mills reducing simultaneously the web and flange portions of the blank and the edging mill rolling the flange edges; then passing the roughly rolled blank through the roughing mill group in the opposite direction; while utilizing the edging mill to roll and shape the projecting shoulders at the junctions of the flange and the web portions, formed during rolling of the blank through the universal mills, to obtain a predetermined shoulder shape in a rough channel steel section; and then passing the rough channel steel section through a finishing structural mill, having horizontal rolls formed with at least one peripheral groove, to further reduce the shoulders.

15. Apparatus for rolling a channel steel section having web and flange portions, comprising, in combination, a reversible roughing mill group including a universal rough rolling mill, and an edging mill, separate from said rough rolling mill, and positioned close to the latter; said edging mill including a conventional first roll for rolling flange edges of an H-section steel; said first roll being engageable with the inside surfaces of the web and flange portions; said edging mill including a second roll engageable with the outer surface of a web portion, the diameter of said second roll gradually increasing, from diametric planes thereof each substantially aligned with a respective inside corner of the web and flange portions, to the axially opposite ends of said second roll.

16. Apparatus for rolling a channel steel section having web and flange portions, comprising, in combination, a reversible roughing mill group including two universal rough rolling mills and an edging mill, separate from said rough rolling mills, and positioned between the latter; the spacing of said universal rough rolling mills being less than that of the material to be rolled; said edging mill including a conventional first roll for rolling flange edges of an H-section steel; said first roll being engageable with the inside surfaces of the web and flange portions; said edging mill including a second roll engageable with the outer surface of a web portion; the diameter of said second roll gradually increasing, from diametric planes thereof each substantially aligned with a respective inside corner of the web and flange portions, to the axially opposite ends of said second roll.

17. Apparatus for rolling a channel steel section, as claimed in claim 15, in which the web engageable portions of each of said first and second rolls are formed with shallow peripheral recesses therein of substantial axial widths less than the widths of the respective web portions engageable by said first and second rolls.

18. Apparatus for rolling a channel steel section, as claimed in claim 16, in which the web engageable portions of each of said first and second rolls are formed with shallow peripheral recesses therein of substantial axial widths less than the widths of the respective web portions engageable by said first and second rolls.

References Cited

UNITED STATES PATENTS

| | | | |
|---|---|---|---|
| 252,460 | 1/1882 | Harris | 72—225 |
| 1,785,986 | 12/1930 | Speer et al. | 72—224 |
| 1,812,247 | 6/1931 | Oberg et al. | 72—225 |
| 1,812,248 | 6/1931 | Oberg | 72—225 |
| 3,165,948 | 1/1965 | Kishikawa | 72—225 |
| 3,251,213 | 5/1966 | Noda | 72—225 |
| 3,335,596 | 8/1967 | Noda et al. | 72—225 |

OTHER REFERENCES

A.P.C. Publication, May 4, 1943, Ser. No. 318,112, G. Zur Nedden et al.

CHARLES W. LANHAM, Primary Examiner

E. M. COMBS, Assistant Examiner

U.S. Cl. X.R.

72—366